(12) United States Patent
Imai et al.

(10) Patent No.: US 10,094,473 B2
(45) Date of Patent: Oct. 9, 2018

(54) HEAT-RESISTANT GASKET

(71) Applicant: NOK CORPORATION, Tokyo (JP)

(72) Inventors: Katsuma Imai, Makinohara (JP);
Nobutake Matsuki, Makinohara (JP);
Masaru Ito, Makinohara (JP)

(73) Assignee: NOK Corporation (JP)

( * ) Notice: Subject to any disclaimer, the term of this patent is extended or adjusted under 35 U.S.C. 154(b) by 524 days.

(21) Appl. No.: 14/771,649

(22) PCT Filed: Feb. 18, 2014

(86) PCT No.: PCT/JP2014/053685
§ 371 (c)(1),
(2) Date: Aug. 31, 2015

(87) PCT Pub. No.: WO2014/132832
PCT Pub. Date: Sep. 4, 2014

(65) Prior Publication Data
US 2016/0025224 A1    Jan. 28, 2016

(30) Foreign Application Priority Data

Mar. 1, 2013    (JP) ................. 2013-040495

(51) Int. Cl.
*F16J 15/08* (2006.01)
*F16J 15/06* (2006.01)
*F16J 15/12* (2006.01)

(52) U.S. Cl.
CPC ......... *F16J 15/065* (2013.01); *F16J 15/0825* (2013.01); *F16J 15/128* (2013.01);
(Continued)

(58) Field of Classification Search
CPC ...... F16J 15/128; F16J 15/0825; F02F 11/002
See application file for complete search history.

(56) References Cited

U.S. PATENT DOCUMENTS

| 4,518,168 A * | 5/1985 | Belter | F16J 15/123 277/601 |
| 4,756,561 A * | 7/1988 | Kawata | F01N 13/1827 277/592 |

(Continued)

FOREIGN PATENT DOCUMENTS

| CN | 101027417 A | 8/2007 |
| CN | 202140196 U | 2/2012 |

(Continued)

*Primary Examiner* — Vishal A Patel
(74) *Attorney, Agent, or Firm* — Harness, Dickey & Pierce, P.L.C.

(57) ABSTRACT

A heat-resistant gasket is provided with a first coating plate in which an annularly continuous emboss portion is formed and which is made of metal, a second coating plate which is arranged so as to face to the first coating plate in a thickness direction and is brought into close contact with a convex surface of the emboss portion, in which end portions in an inner peripheral side of the emboss portion are connected in a state of being in close contact with and lapped over the first coating plate and which is made of metal, and an expanded graphite core which is pinched between the first coating plate and the second coating plate, in a portion between the emboss portion and the overlapped portion of the end portions. Therefore, excellent sealing performance can be maintained even under a high-temperature environment while preventing stress relaxation due to heat.

3 Claims, 2 Drawing Sheets

(52) U.S. Cl.
CPC ............ *F16J 2015/0837* (2013.01); *F16J 2015/0856* (2013.01); *F16J 2015/0862* (2013.01)

(56) References Cited

U.S. PATENT DOCUMENTS

| | | | | | |
|---|---|---|---|---|---|
| 4,781,389 | A | * | 11/1988 | Beyer | F16J 15/123 277/601 |
| 4,791,897 | A | * | 12/1988 | Udagawa | F02F 11/002 123/193.3 |
| 4,834,399 | A | * | 5/1989 | Udagawa | F16J 15/0825 277/592 |
| 4,867,462 | A | * | 9/1989 | Udagawa | F16J 15/0825 277/595 |
| 5,201,534 | A | * | 4/1993 | Miyaoh | F16J 15/0825 277/595 |
| 5,338,046 | A | * | 8/1994 | Willis, Jr. | F02F 11/002 277/592 |
| 5,505,466 | A | * | 4/1996 | Willis | F02F 11/002 277/593 |
| 5,560,623 | A | * | 10/1996 | Yoshino | F16J 15/0825 277/595 |
| 5,630,593 | A | | 5/1997 | Swensen et al. | |
| 5,775,701 | A | * | 7/1998 | Martini | F16J 15/0887 277/591 |
| 7,311,309 | B2 | * | 12/2007 | Udagawa | F16J 15/0825 277/592 |
| 2004/0212156 | A1 | * | 10/2004 | Bric-Carello | F16J 15/128 277/602 |

FOREIGN PATENT DOCUMENTS

| | | |
|---|---|---|
| JP | H05-38464 A | 5/1993 |
| JP | H07-91549 A | 4/1995 |
| JP | H11-315930 A | 11/1999 |
| JP | 2004-525319 A | 8/2004 |
| JP | 2009-243540 A | 10/2009 |

* cited by examiner

HEAT-RESISTANT GASKET

CROSS-REFERENCE TO RELATED APPLICATIONS

This application is a U.S. National Phase Application under 35 U.S.C. 371 of International Application No. PCT/JP2014/053685, filed on Feb. 18, 2014 and published in Japanese as WO 2014/132832 on Sep. 4, 2014. This application claims priority to Japanese Patent Application No. 2013-040495, filed on Mar. 1, 2013. The entire disclosures of the above applications are incorporated herein by reference.

BACKGROUND OF THE INVENTION

Field of the Invention

The present invention relates to a heat-resistant gasket which can maintain an excellent sealing performance even in the case that the gasket is used under a high-temperature environment.

Description of the Conventional Art

Conventionally, as a gasket which is used in a flange joint portion of a flow path pipe fitting in which high-temperature gas circulates, there has been known a metal gasket which forms a bead along an opening for a gas flow path and is constructed by a metal plate elemental substance such as a stainless steel plate. Further, as shown in FIG. 3, there has been known a metal gasket 100 structured by laminating a plurality of metal plates 101 each of which forms a half bead 101a along an outer periphery of a gas passage opening 101b and has an elasticity (refer to Japanese Unexamined Patent Publication No. 2009-243540).

In recent years, in a turbo engine, a temperature of gas circulating in a turbine outlet portion of a turbocharger becomes higher for performance enhancement and environmental response (exhaust gas countermeasure), and specifically goes beyond 800° C. Therefore, in the case that the metal gasket constructed by the stainless steel plate as mentioned above is applied to a pipe line joint portion of the turbine outlet portion of the turbocharger as mentioned above, a stress relaxation phenomenon is generated in the bead 101a due to the exhaust gas having a high temperature. As a result, a seal surface pressure in the bead 101a is lowered, and there is a problem that a gas leakage is generated since a sufficient sealing performance can not be maintained.

Further, even in the case that a heat resisting steel material is employed as a material of the metal gasket, it is hard to maintain an excellent sealing performance under an environment which is higher than 800° C., and in the case of employing a heat resisting alloy which can stand against the heat over 800° C., there is a problem that a material cost becomes significantly high.

Consequently, there has been developed a gasket structured by coating a cushion member made of expanded graphite with the metal plate, however, since an expanded graphite sheet 11 is oxidized at 500 to 600° C. so as to form carbon dioxide, thereby starting disappearance in the expanded graphite, a mica sheet obtained by processing a bronze mica or a white mica is lapped over the expanded graphite for blocking off contact of the high-temperature gas with the expanded graphite as well as the expanded graphite is completely coated with the coating metal plate in the case that the expanded graphite is used under the high-temperature environment as mentioned above (refer to Japanese Unexamined Utility Model Publication No. 5-38464). As a result, a manufacturing cost has been high.

SUMMARY OF THE INVENTION

Problem to be Solved by the Invention

The present invention is made by taking the points mentioned above into consideration, and a technical problem of the present invention is to provide a heat-resistant gasket which can maintain an excellent sealing performance even under a high-temperature environment while preventing stress relaxation due to heat.

Means for Solving the Problem

As a means for effectively solving the technical problem mentioned above, a heat-resistant gasket according to the invention of a first aspect is provided with a first coating plate in which an annularly continuous emboss portion is formed and which is made of metal, a second coating plate which is arranged so as to face to the first coating plate in a thickness direction and is brought into close contact with a convex surface of the emboss portion, in which end portions in an inner peripheral side or an outer peripheral side of the emboss portion are connected in a state of being in close contact with and lapped over the first coating plate and which is made of metal, and a core which is pinched between the first coating plate and the second coating plate, in a portion between the emboss portion and the end portion and is made of expanded graphite.

In the heat-resistant gasket having the structure according to the first aspect, since the core made of the expanded graphite has excellent compression strength and elasticity even under the high temperature, an elastic restoring force can be achieved by being exposed to compression between the first coating plate and the second coating plate, and any stress relaxation is not generated. Further, since the core pinched between the first coating plate and the second coating plate is blocked off the contact with the high-temperature gas and the high-temperature air by the seal portion which is formed by the convex surface of the emboss portion and the seal portion which is formed by the close contact and overlap between the end portions, even under the high-temperature environment, disappearance of the expanded graphite due to the oxidation is prevented. As a result, it is possible to maintain the excellent sealing performance on the basis of the elasticity of the expanded graphite.

A heat-resistant gasket according to the invention of a second aspect is the structure described in the first aspect, wherein a compression restricting plate is interposed between the first coating plate and the second coating plate and in an opposite side to the expanded graphite as seen from the emboss portion.

In the heat-resistant gasket having the structure according to the second aspect, the compression restricting plate interposed between the first coating plate and the second coating plate prevents an over compression of the core made of the expanded graphite.

A heat-resistant gasket according to the invention of a third aspect is the structure described in the first or second aspect, wherein a core member made of a metal is laminated with the expanded graphite of the core.

In the heat-resistant gasket having the structure according to the third aspect, the core member laminated with the expanded graphite of the core and made of the metal improves a handling ability of the core at the manufacturing time of the gasket, and saves a used amount of the expanded graphite.

Effect of the Invention

On the basis of the heat-resistant gasket according to the present invention, the core pinched between the first coating plate and the second coating plate and made of the expanded graphite is blocked off the contact with the high-temperature gas and the high-temperature air by the seal portion which is formed by the convex surface of the emboss portion and the seal portion which is formed by the close contact and overlap between the end portions. Therefore, the disappearance due to the oxidization can be prevented even under the high-temperature environment, it is possible to maintain the compressive strength and the elasticity, and it is possible to achieve the excellent heat resisting sealing performance. Further, since any expensive material such as the heat resisting steel plate is not used, and a use amount of the expanded graphite can be reduced, it is possible to provide the heat-resistant gasket at a low cost.

DETAILED DESCRIPTION OF PREFERRED EMBODIMENT

A description will be in detail given below of a preferable embodiment of a heat-resistant gasket according to the present invention with reference to FIGS. 1 and 2.

Figure 1:
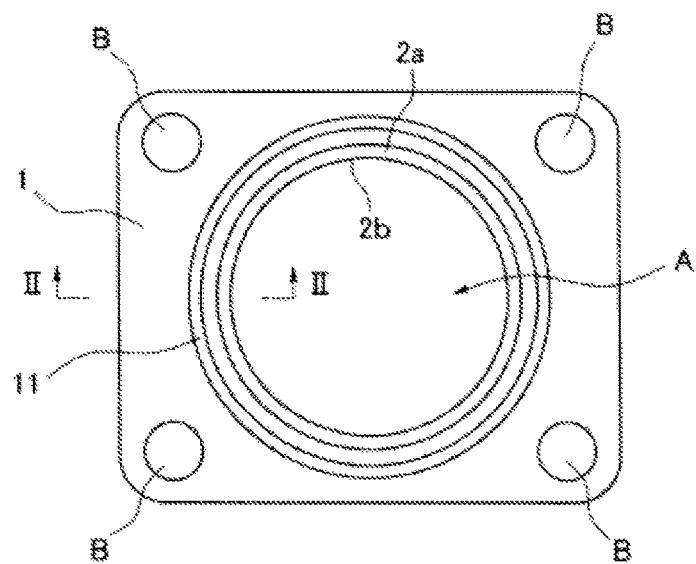
FIG. 1 is a schematic plan view showing an embodiment of a heat-resistant gasket according to the present invention.

The heat-resistant gasket in the embodiment is formed into a corner rounded rectangular plane shape as shown in FIG. 1, is provided with a circular opening portion A forming a gas flow path side in its center, and is provided with a plurality of bolt insertion holes B for inserting bolts for joining a pipe line in its corner portions.

Further, the heat-resistant gasket is provided with a first coating plate 1 in which a continuous emboss portion 11 is formed like a circular ring shape which is concentric to the opening portion A, a second coating plate 2 which is arranged so as to face to the first coating plate 1 in a thickness direction, is brought into close contact with a convex surface 11a of the emboss portion 11 and is connected to the first coating plate 1 in a state of being in close contact with and lapped over the first coating plate 1 by end portions 1a and 1b in an inner peripheral side (an opening portion A side) of the emboss portion 11, a core 3 which is pinched between the first coating plate 1 and the second coating plate 2, in a portion between the emboss portion 11 and the end portions 1a and 2a, and a compression restricting plate 4 which is interposed between the first coating plate 1 and the second coating plate 2 in an outer peripheral side of the emboss portion 11.

Describing in detail, the first coating plate 1 is constructed by a stainless steel plate and is formed into a corner rounded rectangular shape in its outer edge, circular holes (not shown) serving as the bolt insertion holes B are pierced in its corner portions, and the emboss portion 11 is formed in an embossing manner like an approximately semicircular arc cross sectional shape so as to surround an outer periphery of the opening portion A. In an outer appearance shown in FIG. 1, the emboss portion 11 is formed into a circular groove shape.

The second coating plate 2 is also constructed by the stainless steel plate and is formed into a corner rounded rectangular shape having the same shape and the same size as those of the first coating plate 1 in its outer edge, circular holes (not shown) serving as the bolt insertion holes B are pierced in its corner portions, a portion facing to the convex surface 11a having the approximately semicircular arc cross sectional shape in the emboss portion 11 is brought into contact with the convex surface 11a, and the second coating plate 2 is under a state in which an end portion 2a in the inner peripheral side (the opening portion A side) is in close contact and overlapped so as to cover over the end portion 1a in the inner peripheral side of the first coating plate 1 by a fold-back portion 2b which is formed so as to form an approximately J-shaped cross section. Further, an improvement of a concentrated surface pressure by a fastening load in an installed state is achieved by forming the second coating plate 2 appropriately thinner than the first coating plate 1, and an adjustment of a seal surface pressure in the end portion 2a of the second coating plate 2 is achieved.

The core 3 is accommodated in an annular space S which is sealed by the emboss portion 11 of the first coating plate 1 and the close contact portion of the second coating plate 2 between the first coating plate 1 and the second coating plate 2, and the end portions 1a and 2a coming into close contact with and overlapped each other in the first coating plate 1 and the second coating plate 2, and is pinched between the first coating plate 1 and the second coating plate 2. Further, the core 3 is structured by laminating annular two expanded graphite sheets 31 and 32 and an annular core member 33 constructed by a steel plate between the expanded graphite sheets 31 and 32.

The compression restricting plate 4 is constructed by a stainless steel plate or an iron plate which is slightly thinner than the core 3, and is formed into a corner rounded rectangular shape which is the same shape and the same size as those of the first coating plate 1 and the second coating plate 2 in its outer edge. Further, a circular opening portion 4A having a larger diameter than the emboss portion 11 is provided in the center of the compression restricting plate 4, and circular holes (not shown) serving as the bolt insertion holes B are pierced in corner portions thereof.

A height h of the emboss portion 11 of the first coating plate 1 is set higher than a thickness t of the compression restricting plate 4 so that the convex surface 11a of the emboss portion 11 securely comes into close contact with the second coating plate 2 at the fastening time of the heat-resistant gasket. Further, a fold-back width w of the fold-back portion 2b of the second coating plate 2 can be set optionally in a processable range.

The heat-resistant gasket structured as mentioned above is interposed, for example, between joint flanges of a turbine outlet portion in a turbocharger, and is structured such as to seal high-temperature gas circulating in the turbine outlet portion by being fastened.

Further, an elastic restoring force is generated by exposure of the expanded graphite sheets 31 and 32 in the core 3 to compression via the first coating plate 1 and the second coating plate 2, in addition to an elastic force caused by exposure of the emboss portion 11 in the first coating plate 1 to deformation, and an elastic restoring force caused by exposure of the fold-back portion 2b in the second coating plate 2 to deformation, in a state of being fastened between the joint flanges. As a result, a surface pressure which is necessary for gas seal can be obtained in the close contact surface with the joint flanges.

Further, the expanded graphite sheets 31 and 32 in the core 3 has excellent compressive strength and elasticity even under a high temperature which is higher than 800° C., and do not generate any stress relaxation. Further, the expanded graphite sheets 31 and 32 are oxidized by high-temperature gas or air including oxygen under a high-temperature environment which is equal to or higher than 500° C., and generate carbon dioxide so as to disappear little by little. However, according to the structure mentioned above, the close contact force is enhanced by the fastening load between the joint flanges, and the inflow of the high-temperature gas and the high-temperature air into the annular space S in which the core 3 is accommodated can be securely blocked off, in the seal portion formed by the close contact between the convex surface 11a of the emboss portion 11 and the second coating plate 2, and the seal portion formed by the close contact and overlap of the end portions 1a and 2a of the first coating plate 1 and the second coating plate 2. As a result, it is possible to effectively prevent the expanded graphite sheets 31 and 32 from being oxidized and disappeared. Therefore, even if the stress relaxation is generated by the exposure of the first coating plate 1 and the second coating plate 2 to the high temperature, it is possible to achieve an excellent sealing performance against the high-temperature exhaust gas which circulate in the turbine outlet portion.

Further, since the fastening amount of the heat-resistant gasket between the joint flanges is restricted by the compression restricting plate 4, the over compression of the expanded graphite sheets 31 and 32 in the core 3 can be prevented. Therefore, it is possible to prevent the over compression of the expanded graphite sheets 31 and 32, it is possible to suppress settling of the expanded graphite sheets 31 and 32 due to repeated compression load, and it is possible to improve durability.

Further, since the core 3 is structured such that the core member 33 is interposed between the expanded graphite sheets 31 and 32 as well as the core 3 is provided only in the inner peripheral side of the emboss portion 11 between the first coating plate 1 and the second coating plate 2, it is possible to save used amount of the expanded graphite sheets 31 and 32.

Figure 2:
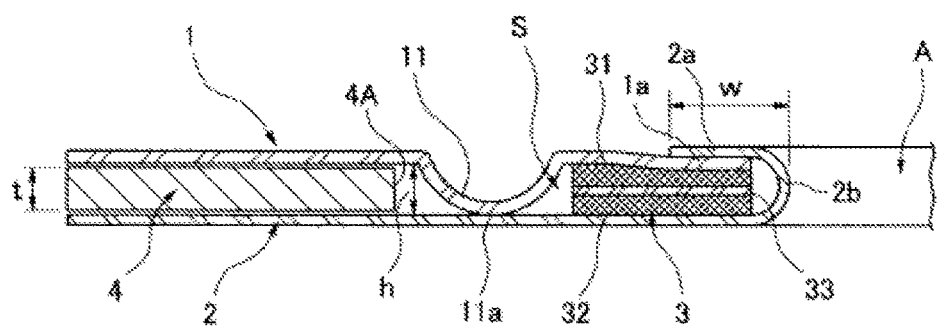
FIG. 2 is a cross sectional view along a line II-II in FIG. 1.
Figure 3:
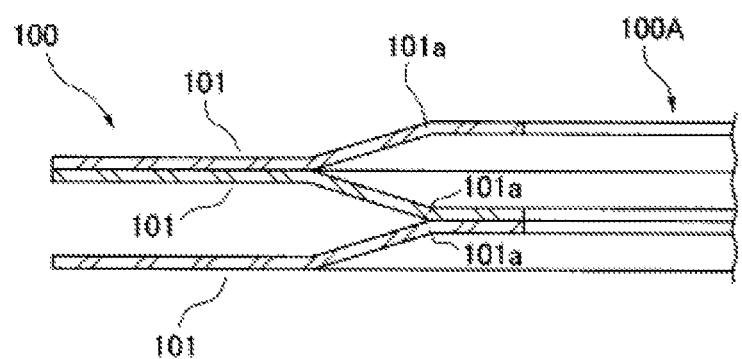
FIG. 3 is a partly cross sectional view showing an example of a heat-resistant gasket according to a prior art.

Further, according to the structure mentioned above, the core 3 and the compression restricting plate 4 are pinched as shown in FIG. 2 by mutual overlap of the end portion 1a in the inner peripheral side of the first coating plate 1 and the end portion 2a of the fold-back portion 2b formed in the inner peripheral portion of the second coating plate 2, in place of the structure in which the core 3 is kept concealed by welding the first coating plate 1 and the second coating plate 2. As a result, it is possible to reduce a manufacturing cost, and it is possible to improve a handling ability of the core 3 at the manufacturing time of the gasket.

The emboss portion may be formed in the second coating plate 2 and may be structured such that a convex surface thereof is brought into close contact with the first coating plate 1. Further, the material of the first coating plate 1, the second coating plate 2 or the compression restricting plate 4 can be appropriately selected in correspondence to the used condition.

Further, in the embodiment mentioned above, the description is given on the assumption that the second coating plate 2 is formed thinner than the first coating plate 1, however, the first coating plate 1 may be inversely made thinner than the second coating plate 2, or the first coating plate 1 and the second coating plate 2 may be formed at the same thickness.

What is claimed is:

1. A heat-resistant gasket comprising:
    a first coating plate in which an annularly continuous emboss portion is formed and which is made of metal;
    a second coating plate which is arranged so as to face to the first coating plate in a thickness direction and is brought into direct contact with a convex surface of said emboss portion, in which end portions in an inner peripheral side or an outer peripheral side of said emboss portion are connected in a state of being in close contact with and lapped over said first coating plate and which is made of metal;
    a core which is pinched between said first coating plate and the second coating plate, in a portion between said emboss portion and said end portion and is made of expanded graphite; and
    a compression restricting plate which is interposed between said first coating plate and said second coating plate and in an opposite side to said expanded graphite as seen from said emboss portion and prevents over compression of said expanded graphite,
    wherein the second coating plate in regions that overlap the compression restricting plate, the embossing portion, and the core is entirely planar, and
    wherein the second coating plate at a location that does not overlap the core is bent to directly contact the first coating plate.

2. The heat-resistant gasket according to claim 1, wherein a core member made of a metal is laminated with the expanded graphite of the core.

3. The heat-resistant gasket according to claim 1, wherein an entirety of the emboss portion has a radius of curvature in a cross-sectional view of the gasket.

* * * * *